United States Patent [19]
Ohnishi

[11] 4,190,867
[45] Feb. 26, 1980

[54] LASER COM WITH LINE DEFLECTION MIRROR INERTIA COMPENSATION

[75] Inventor: Masahiro Ohnishi, Asaka, Japan

[73] Assignee: Fuji Photo Film Co., Ltd., Minami-ashigara, Japan

[21] Appl. No.: 893,634

[22] Filed: Apr. 5, 1978

[30] Foreign Application Priority Data

Apr. 7, 1977 [JP] Japan .................................. 52/39005

[51] Int. Cl.² .......................... H04N 1/02; H04N 1/17
[52] U.S. Cl. .................................... 358/285; 358/288; 358/296; 358/302
[58] Field of Search ............... 358/285, 288, 296, 297, 358/298, 300, 301, 302, 303, 286, 287, 289, 290, 292, 293

[56] References Cited

U.S. PATENT DOCUMENTS

| | | | |
|---|---|---|---|
| 3,560,651 | 2/1971 | Roth | 358/288 |
| 3,795,013 | 2/1974 | McKinley | 358/296 |
| 4,075,664 | 2/1978 | Aoki et al. | 358/286 |
| 4,099,208 | 7/1978 | Tasaku et al. | 358/296 |
| 4,143,403 | 3/1979 | Ohnishi | 358/285 |

Primary Examiner—Robert L. Griffin
Assistant Examiner—Joseph A. Orsino, Jr.
Attorney, Agent, or Firm—Sughrue, Rothwell, Mion, Zinn and Macpeak

[57] ABSTRACT

A vertical line deflection, mirror 8 in a laser COM is driven by a staircase waveform generated in response to scan line synchronizing signals. To avoid data character compression or expansion following a stop or data line skipping operation due to the mirror inertia, video signal generation is delayed for several scan lines following such an operation to allow the mirror to reach a constant rotational speed.

4 Claims, 10 Drawing Figures

LASER COM WITH LINE DEFLECTION MIRROR INERTIA COMPENSATION

BACKGROUND OF THE INVENTION

This invention relates to a method and apparatus for light beam scanning wherein data character distortion following a stop or data line skipping operation due to the inertia of the vertical deflection mirror is compensated for by delaying the video signal generation until the mirror reaches a constant rotational speed.

A COM (computer output microfilmer) is a device for recording the output of a computer directly on a microfilm, and recent COMs employ a laser beam as the scanning light source owing to its high intensity. Mechanical devices such as a rotary multi-surfaced mirror or a vibrating mirror are advantageous as optical deflection means for the scanning beam due to their low optical loss and large deflection angles. For two-dimensionally scanning a light beam the horizontal scanning may be implemented by a rotary multi-surfaced mirror, while for the vertical scanning a vibrating mirror may be employed to successively deflect the scan line to form a raster. Since such mechanical optical deflection devices have inertia, however, it is impossible to abruptly change their rotation speeds. In the vertical deflection of a scan line after a stop of data line skipping operation, for example, it is impossible to quickly change the rotational speed of the vertical deflection mirror and therefore the intervals between the initial scan lines after such an operation are smaller or larger than normal. Accordingly, if character images are recorded on such scan lines they are either compressively or expansively distorted, and thus difficult to read.

SUMMARY OF THE INVENTION

Accordingly, an object of this invention is to provide a method and apparatus for light beam scanning in which the above-described character image distortion due to compressed or expanded intervals between adjacent scan lines is eliminated.

Another object of the invention is to provide a high-speed light beam scanner in which, even following stop or data line skip operations, the recorded character images are regularly arranged.

Briefly, and in accordance with this invention, these and other objects are implemented by the provision of a vertical line deflection mirror in a laser COM driven by a staircase waveform generated in response to scan line synchronizing signals. To avoid data character compression or expansion following a stop or data line skipping operation due to the mirror inertia, video signal generation is delayed for several scan lines following such as operation to allow the mirror to reach a constant rotational speed.

DETAILED DESCRIPTION OF THE PREFERRED EMBODIMENT

Figure 1:
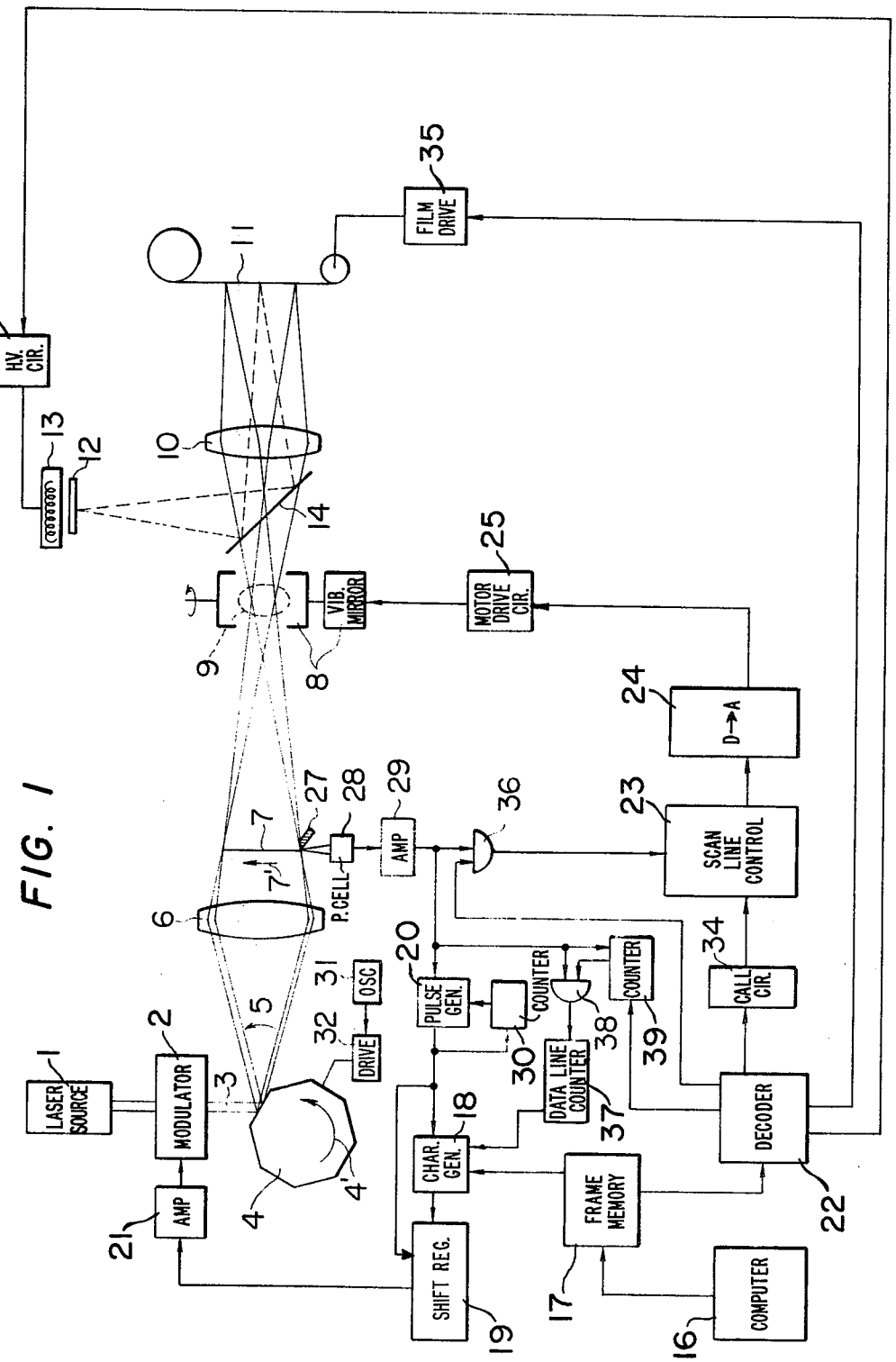
FIG. 1 shows a block diagram of an optical and electrical system in a laser COM device according to the present invention.

In FIG. 1 the light beam emitted by a laser device 1 is intensity-modulated by an optical modulator 2, which may be an acousto-optical or an electro-optical type modulator. The former is employed in this embodiment because it has a better extinction ratio and is more efficient. The intensity-modulated light beam 3 is unidimensionally deflected in the direction of arrow 5 by a multi-surfaced mirror 4 rotated in the direction of arrow 4', and is applied to a scanning lens 6 to form a focused optical point which moves in the direction of arrow 7' to define a scanning line 7. The light beam forming the scanning line 7 is deflected in a direction perpendicular to the deflection direction of the rotary mirror 4 by a "moving-iron" type of vibrating mirror 8 and is then applied to a half mirror 14. The light beam passed through the half mirror 14 is applied to a focusing lens 10 to form a minute optical point which scans a recording medium 11. The vibrating mirror 8 is obtained by mounting a 7 mm×7 mm×1 mm mirror on a G-100PD optical scanner made by the General Scanning Co. in the U.S.A. Since the mirror 8 is disposed to include the minimum cross-section area 9 of the light beam formed by the scanning lens 6, the entire beam cross-section will always be fully incident on the mirror and thus totally reflected without any edge clipping loss. The mirror 8 should be as small as possible because its deflection speed is inversely proportional to its size in terms of its rotational inertia.

The mirror 4 is rotated by the combination of an oscillator 31 and a drive unit 32. A format slide 12 is irradiated by a flash lamp 13, and its image is focussed on the recording medium 11 by the half mirror 14 and the lens 10. Thus, the format slide image is optically superimposed on the data frame information simultaneously formed on the recording medium by the laser beam scanning raster.

In the electrical system the output signal of a data input device 16, such as a computer or a magnetic tape unit, is stored in a one frame memory device 17. The output thereof is applied to a character generator 18 and then subjected to parallel-series conversion by a shift register 19 controlled by a triggered clock pulse generator 20 to form a time-series mode video signal. The signal is amplitude modulated with a high-frequency (110 MHz) signal in a modulator and amplifier 21, subjected to power amplification, and applied to the optical modulator 2 to modulate the laser beam intensity in a time-series mode in accordance with the information or data signal to be recorded.

Of the signals stored in the memory device 17, an instruction signal is decoded by an instruction decoder 22 to thereby control the deflection of the mirror 8 through a calculating circuit 34, a scan line counter and control circuit 23, a digital-to-analog (D/A) converter 24, and a mirror drive circuit 25. The flash lamp 13 is controlled by a high voltage circuit 26, and the film frame feeding is controlled by a film driving device 35.

At the scanning start time of every surface of the mirror 4 the laser beam is reflected by a stationary knife edged mirror 27 disposed in the vicinity of the start point of the scan line 7 onto a photocell 28. The photocell output signal is amplified by an amplifier 29 to thus provide a synchronizing signal for each surface of the mirror 4, and the clock pulse generator 20 is triggered by the trailing edge of the synchronizing signal to form high-frequency clock pulses. After a predetermined number of clock pulses has been counted by a clock pulse counter 30, (1320=10 dots per character×132 characters per line) the operation of the clock pulse generator is suspended. Thus, even with velocity fluctuations and angular division errors of the mirror 4, the start point positions of the scan lines are accurately aligned on the recording medium 11.

The synchronizing signal is also applied as a stepping pulse to the scan line counter and control circuit 23 through an AND gate 36, whereby a staircase waveform is formed by the D/A converter 24.

In the embodiment shown the mirror 4 has twenty-four surfaces (although only eight surfaces are shown in FIG. 1 for simplification) and is rotated at a constant velocity of 10,660 r.p.m. Accordingly, 10,660×24 scan lines are generated per minute, or 4,264 scan lines per second. The staircase waveform generated by the D/A converter 24 is applied to the mirror drive circuit 25 to sequentially or intermittently rotate the mirror 8. Since the staircase waveform rises at a stepping speed of about 4.2 KHz, however, the inertia of the mirror precludes a pure staircase-like response. Accordingly, the light beam is not actually deflected in a staircase-like manner, but instead undergoes a smooth sweep. In other words, the vibrating mirror rotates at a substantially constant speed in response to the high frequency staircase waveform.

When the vertical scanning signal decoded by the instruction decoder 22 is a stop signal, AND gate 36 is disabled to inhibit the passage of the stepping pulses from the amplifier 29, thereby suspending the stepping operation of the scan line counter and control circuit 23. When the vertical scanning instruction signal is a one, two, or three, etc. data line skip signal or a flyback signal, signals corresponding to the equivalent number of scan lines are applied to parallel input terminals of the scan line counter and control circuit 23 by the calculating circuit 34, which effects the necessary conversion. In this embodiment one data line is formed by sixteen (16) scan lines (nine character forming scan lines plus seven line spacing scan lines). Therefore, in the case of a one-data line skip signal instruction, signals for (16+1) scan lines are supplied to the scan line counter and control circuit 23. When a stop condition is changed to a recommence scanning condition, AND gate 36 is again enabled to pass the stepping pulses supplied by the amplifier 29. During the period of time corresponding to the formation of a line space, no video signal is produced and therefore no recording is made.

Figure 2A:
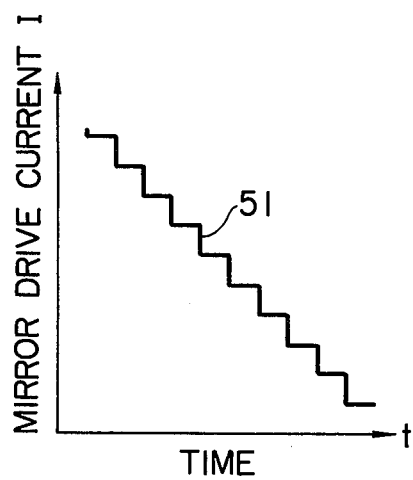
FIGS. 2(a)-(c) through 4(a)-(c) are diagrams illustrating mirror drive current waveforms, mirror rotation speed curves and recorded character images in normal, compressed and expanded modes.
Figure 2B:
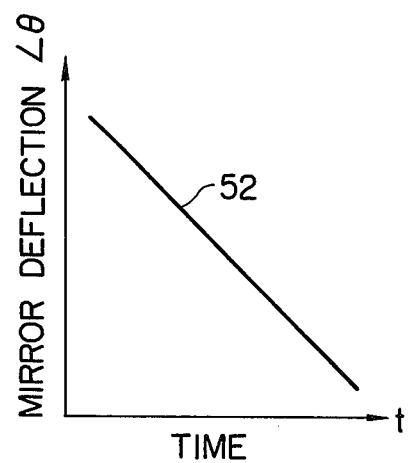
Figure 2C:
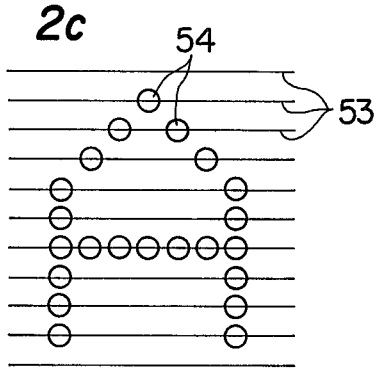

FIG. 2(a) is a graphical representation showing a constant staircase current waveform 51 which is applied to the mirror drive circuit. FIG. 2(b) shows the corresponding rotation curve 52 of the mirror 8 in response to the waveform 51 shown in FIG. 2(a). As is apparent, when a constant staircase waveform is generated in response to the synchronizing signal stepping pulses the mirror 8 is driven at a constant rotational velocity. In this case a regular or undistorted character image "A" is recorded, as shown in FIG. 2(c), because the intervals between the adjacent scan lines are constant. Reference numeral 53 in FIG. 2(c) designates the scan lines while reference numeral 54 designates the character forming dots recorded by the video signal.

Now, the cases where the constant vertical scanning speed is changed, that is, the intervals between the scan lines are not constant, will be described with reference to FIGS. 3 and 4.

Figure 3A:
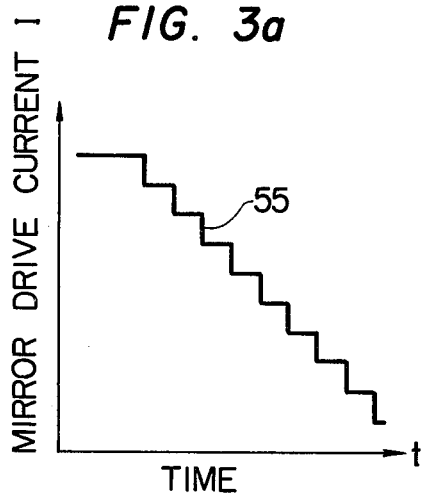
Figure 3B:
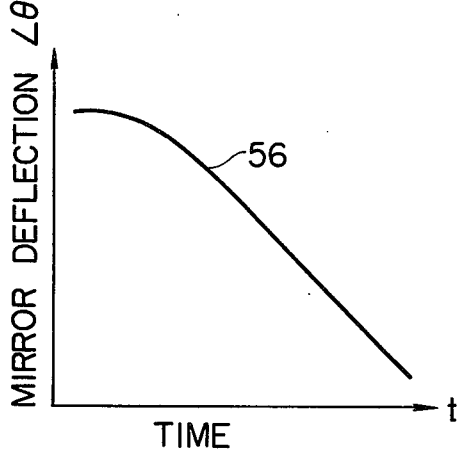
Figure 3C:
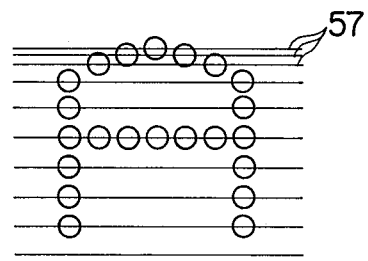

FIG. 3 shows the distortion of the recorded image when the video signal is applied to the optical modulator immediately upon or coincident with the startup or recommencement of the mirror drive after it has been stopped. The current waveform 55 shows the change from a constant value to the normal staircase waveform, while the rotation curve 56 of the mirror 8 shows that its rotational speed increases from zero to a constant value due to its startup inertia. When the video signal is recorded on the resulting scan lines 57, the upper portion of the character image "A" is compressed due to the relatively slow initial rotation of the mirror and the attendantly reduced vertical intervals between the scan lines.

Figure 4A:
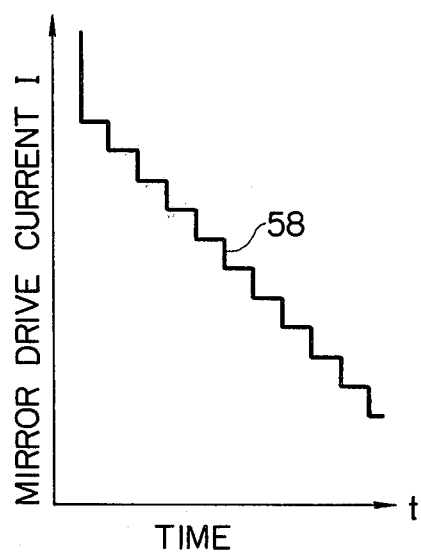
Figure 4B:
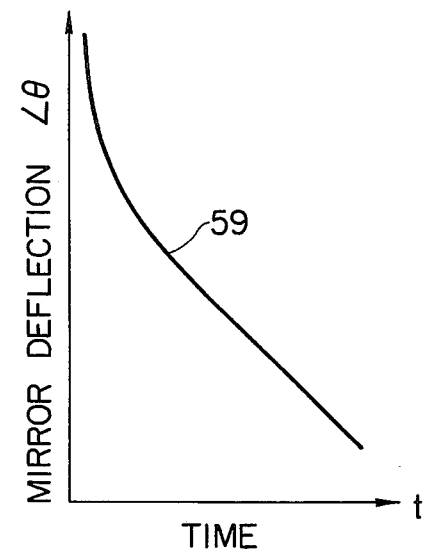
Figure 4C:
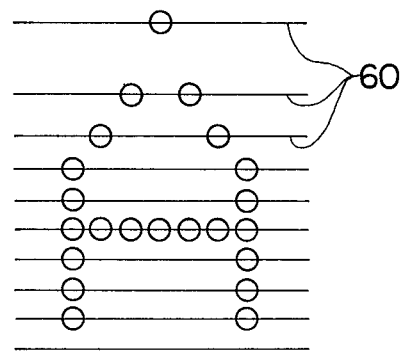

FIG. 4 shows the distortion of the recorded image when the video signal is applied to the optical modulator immediately upon or coincident with a change in the mirror drive speed from a high-speed mode, as during flyback or flyahead, to a normal speed. The current waveform 58 shows the abrupt change from a high value to a normal staircase waveform, while the mirror rotation curve 59 shows the rotational speed descreasing from a high to a constant value due to the inertia of the moving mirror. When the video signal is recorded on the resulting lines 60, the upper portion of the character image "A" is expanded due to the relatively high speed initial rotation of the mirror and the attendantly large vertical intervals between the initial scan lines.

As is apparent from the above description, if a video signal is generated immediately after vertical scanning is temporarily stopped or skipped at a high speed, the upper portion of the recorded image is either contracted or expanded. In accordance with this invention, it has been found that the vertical intervals of the initial three scan lines are either expanded or contracted immediately following a mirror speed change when the scan line frequency is about 4.2 KHz (the scanning period of one scan line is 235 μs), which lowers the quality of the recorded character images. Therefore, and in accordance with this invention, when a data line stop operation has been effected the subsequent video signal is delayed to start with the fourth scan line after stepping pulses corresponding to three scan lines are generated, to thereby bring the mirror up to a substantially constant rotational speed and avoid compression distortion. Similarly, when one, two or three-data line skip operations have been effected, the video signal is delayed a period of time corresponding to the generation of three scan lines plus the number of data line skips being made. The times needed for one, two and three skip operations are equal to the scanning time of one, two and three lines, respectively. Thus, the delay is six scan periods for a three data line skip operation- three scan line periods plus three more to allow for the necessary rotation of the mirror. Such delays result in undistorted characters recorded instead of irregular characters as shown in FIGS. 3 and 4.

When a stop operation has been effected, the synchronizing signal input to a data line counter 37 of the character generator 18 is blocked or disabled at an AND gate 38 until a counter 39 reaches a count of "4". The counter 39 is controlled in this mode by the instruction decoder 22 in response to a stop operation, whereby the video signal generation is appropriately delayed. Similarly, when a skip operation has been effected the synchronizing signals are counted by the counter 39 until a count of "7" has been reached (for a three data line skip), and the AND gate 38 is then opened to initiate the video signal and thus produce a high quality recorded image. Thus, the production of the video signal is inhibited for a period of several scan lines after the start of normal vertical scanning. The appropriate number of scan line delays may be suitably determined in accordance with the system characteristics such that the counting operation of the data line counter 37 of the character generator 18 is disabled for a sufficient period of time to allow the mirror deflection/rotation to reach a constant speed.

The invention is not limited by the numerical data described above. For instance, if the horizontal scanning frequency is decreased the number of distortion compensating scan line delays may be decreased to one or two.

What is claimed is:

1. In a method of two-dimensionally scanning a recording light beam intensity modulated in accordance with a data signal, including successively horizontally deflecting the light beam and simultaneously vertically deflecting it with a rotating mirror, a method of eliminating character image distortion immediately following a vertical scan stop or data line skipping operation due to the inertia of the rotating mirror, characterized by:

decreasing the intensity of the light beam to a level below a recording level immediately following a vertical scan stop or data line skipping operation for a period of time sufficient to allow the rotating mirror to reach a substantially constant rotational speed.

2. A method as defined in claim 1, wherein the light beam is a laser beam, the rotating mirror is driven by a staircase waveform stepped in response to horizontal line scan synchronizing signals, and the beam intensity is decreased by delaying the generation of a data character signal until a predetermined number of horizontal line scan synchronizing signals have been counted.

3. In an apparatus for two-dimensionally scanning a recording light beam intensity modulated in accordance with a data signal, including means for successively horizontally deflecting the light beam and means for simultaneously vertically deflecting it with a rotating mirror, means for eliminating character image distortion immediately following a vertical scan stop or data line skipping operation due to the inertia of the rotating mirror, characterized by:

means for decreasing the intensity of the light beam to a level below a recording level immediately following a vertical scan stop or data line skipping operation for a period of time sufficient to allow the rotating mirror to reach a substantially constant rotational speed.

4. An apparatus as defined in claim 3, wherein the light beam is a laser beam, the rotating mirror is driven by a staircase waveform stepped in response to horizontal line scan synchronizing signals, and the beam intensity is decreased by means for delaying the generation of a data character signal until a predetermined number of horizontal line scan synchronizing signals have been counted.

* * * * *